W. BOULTON.
CUTTING ASHLARS.
No. 105,633. Patented July 26, 1870.
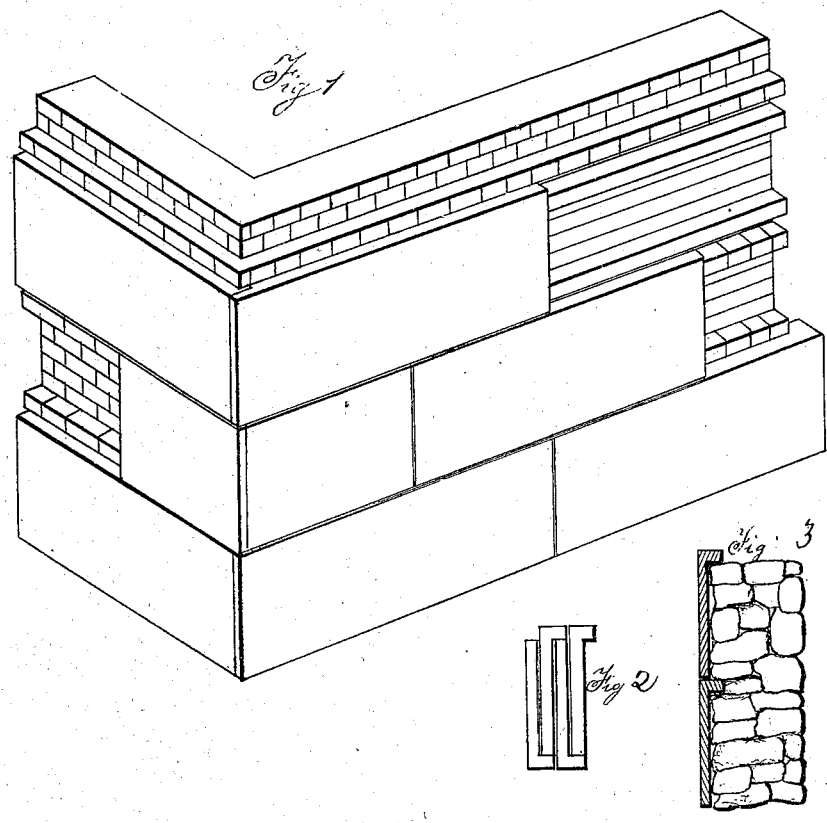

United States Patent Office.

WILLIAM BOULTON, OF TOMPKINSVILLE, STATEN ISLAND, NEW YORK.

Letters Patent No. 105,633, dated July 26, 1870.

IMPROVEMENT IN CUTTING ASHLARS.

The Schedule referred to in these Letters Patent and making part of the same.

*To all whom it may concern:*

Be it known that I, WILLIAM BOULTON, of Tompkinsville, Staten Island, in the county of Richmond and State of New York, have invented certain new and useful Improvements in Cutting or Making Ashlars, and building and constructing walls for buildings and other purposes composed of ashlars so cut, and brick or stone; and I do hereby declare that the following is a full, clear, and exact description of the same, reference being had to the accompanying drawing, which makes part thereof, and in which—

Figure 1 represents a view, in perspective, of my improvement, showing a corner section of the wall, the form of the ashlars, and the manner of laying the courses of brick or stone, the flange of the ashlars being laid between the several courses of brick or stone-work;

Figure 2 represents a section of a block of stone or marble, showing the manner in which a block of stone or marble is cut into ashlars, having a flange upon one side; and Figure 3 represents a vertical transverse section of the wall, composed in whole of ashlar and stone or rubble, or composed in part of stone and in part of brick.

Having stated the nature and object of my invention, I proceed to describe its operation in the cutting of ashlars from a block of stone or marble, as represented by Figure 6.

The block is cut alternately on the top and bottom of the thickness required for the one side, and of the thickness of the ashlars on the other side. Each ashlar is then cut separately and alternately from the block. When one is cut, it is removed, so as to gain room for cutting the next, and so on alternately to the end of the block, by which peculiar mode of cutting the stone nearly double the surface for facing is obtained, and, at the same time, the advantage of double the thickness on the flanged portion of the ashlars.

I am aware that in faces for inner and outer surfaces of walls or buildings, each piece of facing is furnished with a shoulder, offset or arm: but

What I claim as new is—

The manner of cutting ashlars from blocks of stone or marble into ashlars having a flange upon one edge, substantially as and for the purposes described.

WILLIAM BOULTON.

Witnesses:
F. P. LOVEGROW,
W. S. HORNFAGER.